(12) United States Patent
Bortoluzzi et al.

(10) Patent No.: US 12,054,438 B2
(45) Date of Patent: Aug. 6, 2024

(54) SLURRY INFILTRATION HEAT TREATMENT METHOD

(71) Applicant: Rolls-Royce High Temperature Composites Inc., Cypress, CA (US)

(72) Inventors: Camila S. Bortoluzzi, Huntington Beach, CA (US); Sungbo Shim, Irvine, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 871 days.

(21) Appl. No.: 17/006,191

(22) Filed: Aug. 28, 2020

(65) Prior Publication Data

US 2021/0155558 A1    May 27, 2021

Related U.S. Application Data

(60) Provisional application No. 62/939,831, filed on Nov. 25, 2019.

(51) Int. Cl.
*C04B 41/52* (2006.01)
*C04B 35/628* (2006.01)
(Continued)

(52) U.S. Cl.
CPC ........ *C04B 41/52* (2013.01); *C04B 35/62863* (2013.01); *C04B 35/62871* (2013.01);
(Continued)

(58) Field of Classification Search
CPC .............. C04B 41/52; C04B 35/62863; C04B 35/62871; C04B 35/80; C04B 41/0072;
(Continued)

(56) References Cited

U.S. PATENT DOCUMENTS 5,051,226 A      9/1991  Brustad
5,319,007 A  *   6/1994  Bright .............. B29D 11/00432
                                               523/516
(Continued)

FOREIGN PATENT DOCUMENTS

CN      103 922 779 B      7/2015

OTHER PUBLICATIONS

European Search Report from corresponding European application No. EP 20 206 401, Mar. 16, 2021, 6 pp.
(Continued)

*Primary Examiner* — Michael G Miller
(74) *Attorney, Agent, or Firm* — Shumaker & Sieffert, P.A.

(57) ABSTRACT

A method of producing a melt infiltrated ceramic matrix composite (CMC) article that includes the steps of: forming a ceramic fiber preform; optionally, rigidizing the ceramic fiber preform with a fiber interphase coating via a Chemical Vapor Infiltration (CVI) process, infiltrating a ceramic slurry into the porous body or preform, conducting one or more secondary operations, and finally, melt infiltrating the preform with molten silicon or a silicon alloy to form the CMC article. The infiltration of a ceramic slurry into a ceramic fiber preform to form a green body is performed along with the use of convection and/or conduction as heat transfer mechanisms, such that the ceramic slurry does not require the incorporation of a pre-gelation material in order for the slurry to remain within the green body during subsequent processing steps.

20 Claims, 3 Drawing Sheets

(51) Int. Cl.
*C04B 35/80* (2006.01)
*C04B 41/00* (2006.01)
*C04B 41/45* (2006.01)
*C04B 41/50* (2006.01)
*C04B 41/51* (2006.01)

(52) U.S. Cl.
CPC .......... *C04B 35/80* (2013.01); *C04B 41/0072* (2013.01); *C04B 41/4525* (2013.01); *C04B 41/4531* (2013.01); *C04B 41/4578* (2013.01); *C04B 41/4584* (2013.01); *C04B 41/5001* (2013.01); *C04B 41/5059* (2013.01); *C04B 41/5066* (2013.01); *C04B 41/5096* (2013.01); *C04B 41/5105* (2013.01); *C04B 2235/524* (2013.01); *C04B 2235/5252* (2013.01); *C04B 2235/614* (2013.01); *C04B 2235/616* (2013.01); *C04B 2235/6567* (2013.01)

(58) Field of Classification Search
CPC ............ C04B 41/4525; C04B 41/4531; C04B 41/4578; C04B 41/4584; C04B 41/5001; C04B 41/5059; C04B 41/5066; C04B 41/5096; C04B 41/5105

See application file for complete search history.

(56) References Cited

U.S. PATENT DOCUMENTS

| | | | |
|---|---|---|---|
| 9,630,885 | B2 | 4/2017 | Goetz et al. |
| 2016/0009602 | A1 | 1/2016 | Brun |
| 2017/0059165 | A1* | 3/2017 | Nanda ...................... F23R 3/48 |
| 2017/0368668 | A1* | 12/2017 | Dukes ...................... B24D 3/28 |
| 2018/0305263 | A1* | 10/2018 | Shim ...................... C04B 38/068 |

OTHER PUBLICATIONS

Notice of Intent to Grant and Text Intended to Grant from counterpart European Application No. 20206401.0 dated Jan. 5, 2024, 11 pp.

Response to Extended Search Report dated Mar. 31, 2021, from counterpart European Application No. 20206401.0 filed Sep. 22, 2021, 51 pp.

* cited by examiner

SLURRY INFILTRATION HEAT TREATMENT METHOD

RELATED APPLICATION

The present patent document claims the benefit of priority under 35 U.S.C. § 119(e) to U.S. Provisional Patent Application No. 62/939,831, which was filed on Nov. 25, 2019, and is hereby incorporated by reference in its entirety.

TECHNICAL FIELD

This disclosure relates generally to a method of forming ceramic matrix composite (CMC) articles. More specifically, this disclosure relates to a slurry infiltration heat treatment or transfer method used in the formation of the CMC articles.

BACKGROUND

The statements in this section merely provide background information related to the present disclosure and may not constitute prior art.

Articles formed from a ceramic matrix composite (CMC) are commonly used in a variety of structural applications due to their thermal resistance, high temperature strength, and chemical stability. In order to make such CMC articles, a plurality of ceramic fibers are initially formed into a desired shape, i.e., into a preform, which may be subsequently rigidized with one or more ceramic phases. The remaining porosity in the preform is then infiltrated with a ceramic slurry and bonded with a molten alloy. For example, a silicon carbide (SiC:SiC) matrix composite may be made by infiltrating a silicon carbide slurry into a porous SiC fiber preform followed by drying and the subsequent introduction of molten silicon or a silicon (Si) containing alloy into any porosity that remains in the slurry infiltrated preform through the use of capillary forces in order to densify the structure and form the CMC article.

However, the occurrence of non-uniformities in the distribution of the solid particulates or particles present in the ceramic slurry during infiltration or drying of the ceramic matrix composite (CMC) may affect the performance of the final CMC article. In order to improve the uniformity of the ceramic particles (e.g., solid particulate fillers) that are infiltrated into the pores and interstices of the fiber preform and to ensure that this ceramic slurry remains in the pores and interstices during subsequent processing steps, the present disclosure is directed to a method in which the infiltration of the slurry includes an effective heat transfer mechanism. The resulting green body of the present disclosure is more uniformly infiltrated with the ceramic slurry, which can maximize the efficiency of subsequent molten alloy infiltration steps and reduce the overall residual porosity within the finished article.

DRAWINGS

In order that the disclosure may be well understood, there will now be described various forms thereof, given by way of example, reference being made to the accompanying drawings, in which.

Figure 1:
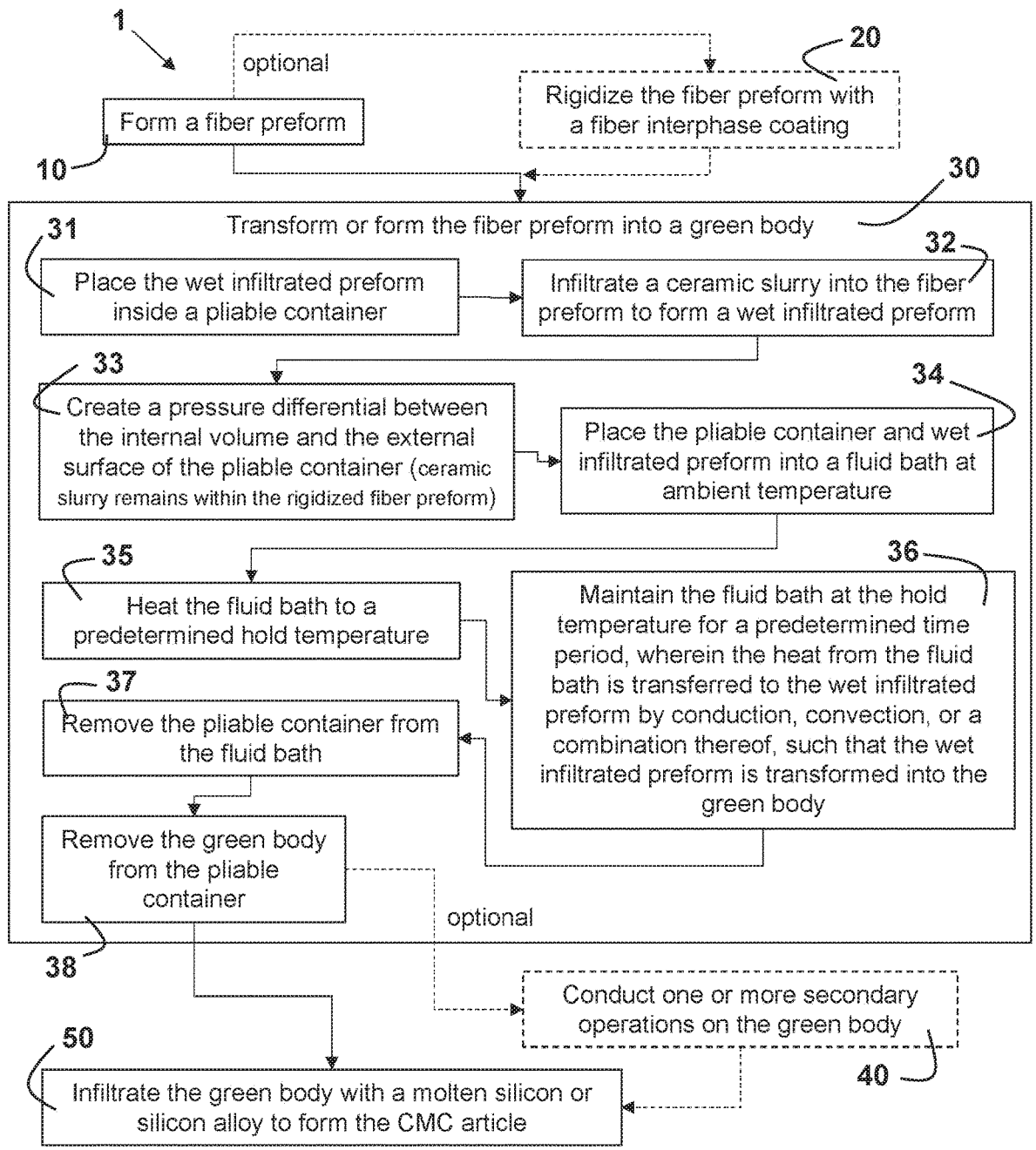
FIG. 1 is a flowchart of a method for forming a ceramic matrix composite (CMC) article according to the teachings of the present disclosure that includes process steps for forming a green body therein.

The drawings described herein are for illustration purposes only and are not intended to limit the scope of the present disclosure in any way. An additional description of the drawings is provided in Appendix A attached hereto, the contents of which are included as part of this specification.

DETAILED DESCRIPTION

The present disclosure provides a method of producing a melt infiltrated ceramic matrix composite (CMC) article, including, without limitation, silicon carbide matrix (SiC:SiC) composite articles. This method generally comprises the steps of: forming a ceramic fiber preform; optionally, rigidizing the ceramic fiber preform with a fiber interphase coating via a Chemical Vapor Infiltration (CVI) process, infiltrating a ceramic slurry into the porous body or preform, optionally, conducting one or more secondary operations, and finally, melt infiltrating the preform with molten silicon or a silicon alloy to form the CMC article.

The following description is merely exemplary in nature and is in no way intended to limit the present disclosure or the application or use thereof. For example, the method of preparing ceramic matrix composites (CMCs) according to the teachings contained herein is described throughout the present disclosure in conjunction with a specific fluid bath design or set-up in order to more fully illustrate the composition and the use thereof. The incorporation and use of such a method of conduction heat transfer in the preparation of other CMCs with other fluid bath designs is contemplated to be within the scope of the present disclosure.

For the purpose of this disclosure the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one source", "one or more sources", and "source(s)" may be used interchangeably and are intended to have the same meaning.

For the purpose of this disclosure, the term "temperature control" describes controlling a temperature with minimal variation, such as ±5° C.; alternatively, ±3° C.; alternatively, ±1° C.; alternatively, ±0.5° C. When desirable, this control over the variation in temperature may also be expressed as a percentage of the measured temperature. For example, as the measured temperature is controlled to be within ±10%; alternatively, ±5%; alternatively, ±3%; alternatively, ±1%.

The recitations of numerical ranges by endpoints include the endpoints and all numbers within that numerical range. For example, a concentration ranging from 40% by volume to 60% by volume includes concentrations of 40% by volume, 60% by volume, and all concentrations therebetween (e.g., 40.1%, 41%, 45%, 50%, 52.5%, 55%, 59%, etc.).

For purposes of promoting an understanding of the principles of the present disclosure, reference will now be made to the embodiments illustrated in the drawings, and specific language will be used to describe the same. It should be understood that throughout the description, corresponding reference numerals indicate like or corresponding parts and features. One skilled in the art will further understand that any properties reported herein represent properties that are routinely measured and may be obtained by multiple different methods. The methods described herein represent one such method and other methods may be utilized without exceeding the scope of the present disclosure.

No limitation of the scope of the present disclosure is intended by the illustration and description of certain embodiments herein. In addition, any alterations and/or modifications of the illustrated and/or described embodiment(s) are contemplated as being within the scope of the present disclosure. Further, any other applications of the principles of the present disclosure, as illustrated and/or described herein, as would normally occur to one skilled in the art to which the disclosure pertains, are contemplated as being within the scope thereof.

Referring to FIG. 1, a method 1 of producing a ceramic matrix composite (CMC) article is provided. This method 1 comprises the steps of: forming 10 a fiber preform; optionally, rigidizing 20 the fiber preform with a fiber interphase coating; transforming 30 the fiber preform into a green body; optionally, conducting 40 one or more secondary operations on the green body; and infiltrating 50 the green body with a molten silicon or silicon alloy to form the CMC article. The step of transforming 30 the fiber preform into a green body is further subdivided into multiple steps 31-38 that are involved in performing such transformation.

The method of transforming or forming 30 the fiber preform into a green body comprises the steps of: placing 31 the fiber preform inside a pliable container having an internal volume and an external surface; infiltrating 32 a ceramic slurry into the fiber preform to form a wet infiltrated preform; creating 33 a pressure differential between the internal volume and the external surface of the pliable container, such that the ceramic slurry remains within the rigidized fiber preform; placing 34 the pliable container and wet infiltrated preform into a fluid bath at ambient temperature; heating 35 the fluid bath to a predetermined hold temperature; maintaining 36 the fluid bath at the hold temperature for a predetermined time period, wherein the heat from the fluid bath is transferred to the wet infiltrated preform by conduction, convection, or a combination thereof, such that the wet infiltrated preform is transformed into the green body; removing 37 the pliable container from the fluid bath; and removing 38 the green body from the pliable container.

A ceramic matrix composite (CMC) article is generally made from a lay-up of a plurality of continuous ceramic fibers, formed to a desired shape. At this stage in the production of a CMC article or component, the lay-up is generally known as a ceramic fiber preform, fiber preform, or preform. The fiber preform, which may be partially rigid or non-rigid, may be constructed in any number of different configurations. For example, the preform may be made of filament windings, braiding, and/or knotting of fibers, and may include two-dimensional and three-dimensional fabrics, unidirectional fabrics, and/or nonwoven textiles. The fibers used in the preform, furthermore, may comprise any number of different materials capable of withstanding the high processing temperatures used in preparing and operating CMC articles, such as, but not limited to, carbon fibers, ceramic fibers (e.g., silicon carbide, alumina, mullite, zirconia, or silicon nitride), which can be crystalline or amorphous. The ceramic fibers may be suitably coated by various methods. Alternatively, the fiber preform comprises fibers that include one or more of silicon carbide (SiC), silicon nitride ($Si_3N_4$), or a mixture or combination thereof. Each of the fibers is individually selected and may be of the same or different composition and/or diameter. Alternatively, the fibers are the same in at least one of said composition and/or diameter. The ceramic fiber filaments may have a diameter that is between about 1 micrometer ($\mu$m) to about 50 $\mu$m; alternatively, about 5 $\mu$m to about 30 $\mu$m; alternatively, about 10 $\mu$m to about 20 $\mu$m.

When desirable or required, the ceramic fibers in the preform may be treated or rigidized by applying a single fiber interphase coating or a plurality of such coatings thereto. The general purpose of the interphase coating(s) is to facilitate and/or enhance compatibility between the ceramic fibers and the ceramic slurry and/or the molten silicon or silicon alloy that is subsequently added in order to densify the preform and form the ceramic matrix composite. The rigidizing of the fiber preform may also enhance the toughness (e.g., crack reduction) exhibited by the final CMC article, as well as reduce or prevent reaction between the ceramic fibers and the molten alloy.

The interphase coating(s) may be applied to the fiber preform using any method known to one skilled in the art, including but not limited to chemical vapor infiltration (CVI) or chemical vapor deposition (CVD) processes; alternatively, by a CVI process. Several examples of such interphase coatings include, without limitation, carbon, aluminum nitride, boron nitride, silicon nitride, silicon carbide, boron carbide, metal borides, transition metal silicides, transition metal oxides, transition metal silicates, rare earth metal silicates, and mixtures or combinations thereof. Alternatively, the fiber interphase coating comprises silicon carbide (SiC), silicon nitride ($Si_3N_4$), or a mixture or combination thereof. When used, the fiber interphase coating(s) may have a thickness that is in the range of about 0.01 micrometers ($\mu$m) to about 20 micrometers ($\mu$m); alternatively between about 0.05 $\mu$m to 15 $\mu$m; alternatively from about 0.1 $\mu$m to about 10 $\mu$m; alternatively, from about 0.5 $\mu$m to about 5 $\mu$m.

Still referring to FIG. 1, the fiber preform may be transformed 30 into a green body by the infiltration of a ceramic slurry into the preform and heating the ceramic slurry in the preform. This ceramic slurry comprises, consists essentially of, or consists of a plurality of solid particulate fillers, one or more reactive additives, a solvent, and optionally, one or more dispersants, binders, and/or gelation polymers. The ceramic slurry infiltrated into the porous fiber preform comprises a solid loading in the range of about 5 vol. % to about 80 vol. %; alternatively in the range of about 10 vol. % to about 70 vol. %; alternatively, in the range of about 15 vol. % to about 65 vol. %; alternatively, in the range of about 20 vol. % to about 60 vol. %, relative to the overall volume of the ceramic slurry.

As the ceramic slurry infiltrates 32 the fiber preform, the solid particulate fillers flow into the pores and interstices that exist between the ceramic fibers. The infiltration 32 of the ceramic slurry may be accomplished in a single step or may comprise multiple infiltration steps in order to ensure that the fiber preform is fully impregnated with the solid particulate fillers. Each additional infiltration step may be performed using a ceramic slurry composition that is either the same as or different form the composition used in the first impregnation step.

The solid particulate fillers in the ceramic slurry may comprise, without limitation aluminum nitride, aluminum diboride, boron carbide, alumina, mullite, zirconia, carbon, silicon carbide, silicon nitride, transition metal nitrides, transition metal borides, rare earth oxides, and mixtures and combinations thereof. Alternatively, the solid particulate fillers comprise silicon carbide (SiC), silicon nitride ($Si_3N_4$), or a mixture or combination thereof. The solid particulate fillers may comprise one or more regular or irregular shapes including, without limitation, spheres and rods. The size of the solid particulate fillers may vary, but generally, exhibit a diameter, i.e., the length of major dimension, that is less than about 50 micrometers; alternatively in the range of about 100 nanometers (nm) up to about 50 micrometers ($\mu m$); alternatively, greater than 200 nm; alternatively, between about 300 nm and about 25 $\mu m$.

The solid particulate fillers are typically present in various sizes and give rise to a particle size distribution that can be characterized by a mean average particle size or diameter. These solid particulate fillers may result in a mono-, bi-, or multi-modal distribution being observed upon the measurement of a particle size distribution for the ceramic slurry using any conventional technique, such as sieving, microscopy, Coulter counting, dynamic light scattering, or particle imaging analysis, to name a few.

The one or more reactive additives included in the composition of the ceramic slurry may comprise, without limitation, at least one of graphite, diamond, carbon black, molybdenum (Mo), and tungsten (W).

The solvent present in the ceramic slurry may be any solvent known for use in such materials used to infiltrate fiber preforms during the formation a ceramic matrix composite (CMC) article. Several examples, of such solvents include, but are not limited to, polyvinylpyrrolidone, isopropanol, polyvinyl alcohol, water, and mixtures thereof.

The one or more dispersants, optionally included in the composition of the ceramic slurry may comprise, but not be limited to, an anionic, cationic, or nonionic surfactant, including for example, polyethylene glycol (PEG). The optional binders included in the composition of the ceramic slurry may comprise, without limitation, polyethyleneimine (PEI). The composition of any optional gelation polymers may include, but not be limited to, carboxymethyl cellulose.

One skilled in the art will understand and appreciate that the reactive additives and the optional dispersants and/or binders present in the ceramic slurry are not the same as the pre-gelation materials conventionally incorporated into a ceramic slurry, including those described in U.S. Pat. No. 9,630,885, the content of which is incorporated herein by reference. Examples of such pre-gelation materials include polysaccharides, such as methyl cellulose, carboxymethyl cellulose, hydroxypropyl methyl cellulose, gellan gum, agarose, carrageenan, and mixtures and combinations thereof. Rather, the ceramic slurry of the present disclosure does not need or require the presence of such pre-gelation materials. However, a ceramic slurry that incorporates such pre-gelation materials may be utilized and receive the benefits associated with the method described herein. Alternatively, the ceramic slurry of the present disclosure does not include any such pre-gelation materials.

Pre-gelation materials are conventionally used to enhance the uniformity of infiltration of the slurry particulate into the interstices (e.g., pores) of the preform, and ensure that the particles in the slurry remain in said interstices during subsequent processing steps. In conventional ceramic slurries, the pre-gelation material becomes at least partially gelled after the slurry infiltrates into the interstices in the fiber preform, thereby providing a network capable of retaining the slurry particulates in the interstices during subsequent processing steps. The establishment of this network is necessary because the application of heat to dry the ceramic slurry and form a green body conventionally is accomplished via an inefficient free convection heat transfer mechanism. In a conventional process, a gas (e.g., air) is heated, such that the hot gas slowly transfers heat to the ceramic slurry.

In the present disclosure, one or more heat transfer methods are utilized, such that heat reaches the wet infiltrated preform more quickly. More specifically, heat is transferred by the movement of the fluid to the infiltrated fiber preform via convection. In this process, the fluid is heated, such that hot areas of the fluid flow and mix with the cool areas of the fluid in the bath. Thus, convection heating represents an effective way of moving a hot fluid or a cold fluid from one area to another area in the bath.

Thermal energy in the present disclosure may also be transferred via conduction from one substance to another substance when the substances are in direct contact with each other and/or movement of the fluid is no longer actively occurring. In such a conduction mechanism, heat travels through a material as one molecule transfers energy to neighboring molecules. The use of conduction heat transfer and/or convection heat transfer represents one of the benefits associated with the method of forming a ceramic matrix composite (CMC) article in the present disclosure. More specifically, the ability to use conduction, convection, or a combination of both of these heat transfer methods in the present disclosure provides for a more uniform temperature profile within the ceramic slurry infiltrated into the fiber preform. In fact, the temperature difference between the fluid bath and the ceramic slurry in the wet infiltrated preform is less than 5° C.; alternatively, less than 3° C.; alternatively, between about 0.5° C. and about 4° C. The fluid used in the heated bath is not necessarily limited. This fluid may be, without limitation, water; an alcohol, such as methanol, ethanol, or propanol; an oil, such as silicone oil or mineral oil; a glycol, such as ethylene glycol or propylene glycol; glycerol; perfluorocarbon fluid; or any desirable mixture or combination thereof.

In the present disclosure, the heat generated by the fluid bath is equilibrated with the surface of the pliable container by convection arising from the movement of the fluid in the bath and subsequently transferred via a conduction in the absence of fluid movement to the ceramic slurry that is infiltrated into fiber preform. The use of such convection and/or conduction mechanisms allows the heat to be delivered into the fiber preform much quicker than through a free convection mechanism as used in a conventional process. In fact, the use of the heat transfer method of the present disclosure reduces the overall processing time by allowing the next batch of fiber preforms to be processed into ceramic matrix composite (CMC) articles from minutes to hours earlier; alternatively, at least 3 hours earlier.

The fluid bath is heated from ambient temperature (about 20° C.) to a predetermined hold temperature, which is in the range from about 25° C. to about 80° C.; alternatively, from about 30° C. to about 80° C.; alternatively, from about 35° C. to about 75° C. The heating of the fluid bath is performed at a rate that ranges from about 0.1° C./min to about 3.0° C./min; alternatively, from about 0.3° C./min to about 2.5° C./min; alternatively, from about 0.5° C./min to about 2.0°

C./min, such that the predetermined hold temperature is reached in less than 2 hours. Alternatively, the hold temperature is reached in less than 90 minutes; less than 60 minutes; or in about 50 minutes. Temperature control is conducted, such that the hold temperature is maintained for a predetermined time period that ranges from about 5 minutes to about 24 hours; alternatively, from about 1 hour to about 15 hours; alternatively, from about 3 hours to about 12 hours; alternatively, greater than 3 hours and less than 8 hours. When desirable, the fluid bath may be a heated bath circulator in which the fluid is circulated in order to distribute the heat throughout the bath efficiently and homogenously. The use of such a heated bath circulator assists in ensuring that heat transfer from the fluid bath to the ceramic slurry in the wet infiltrated preform is uniformly distributed.

The pliable container in which the fiber preform prior to being infiltrated with the ceramic slurry is placed may include, without limitation, a plastic bag or a pouch formed from a polymeric sheet or film. The pliable container is typically sealed on three sides with the fourth side being reversibly sealable after the wet, infiltrated fiber preform is placed therein. The plastic bag or pouch effectively encapsulates the infiltrated fiber preform and provides a barrier between the preform and the fluid in the fluid bath. The composition of the pliable container may be any polymeric material that can withstand the application of a pressure differential and the temperature at which the fluid bath is heated. A pressure differential may be created between the internal volume and external surface of the pliable container by any method known in the art, including but not limited to creating a vacuum. This pressure differential may be created prior to infiltration and maintained during infiltration of the ceramic slurry into the fiber preform.

Still referring to FIG. 1, following the formation of a green body from the fiber preform 30, the green body may be subjected to 40 one or more secondary operations when necessary or desirable. Several examples of these secondary operations include, without limitation, the removal of excess ceramic slurry, defects, or other surface imperfections from the green body, as well as drying the green body in order to remove fluid or other residual solvents that may remain within the green body. The removal of the imperfections or defects may be accomplished by any means known to one skilled in the art, including but not limited to grinding, sanding, brushing, or polishing with or without the an abrasive medium. The drying of the green body may be accomplished by any suitable manner, including without limitation, drying at ambient temperature under vacuum at about 1 Torr or at ambient pressure along with exposure to a predetermined temperature that ranges from ambient or room temperature (about 20° C.) up to 400° C.; alternatively, the predetermined temperature is greater than 100° C.; alternatively from about 150° C. to about 300° C. The ramp rate used to increase the temperature from ambient temperature up to the predetermined temperature may be on the order of less than 2° C. per minute; alternatively about 1.5° C. per minute; alternatively between about 1° C./minute to about 2° C./minute.

One of the final steps in the fabrication of a ceramic matrix composite (CMC) is melt infiltration, in which a molten metal or metal alloy is infiltrated 50 into any porosity that remains or is still present in the fiber preform. After completion of any optional secondary processing operations 40, a molten metal or metal alloy is infiltrated 50 into the green body. This molten metal or metal alloy occupies any remaining interstices that may be present between the solid particulate fillers and ceramic fibers until the green body is fully densified to less than about 7% porosity; alternatively, 5% porosity; alternatively, less than about 3% porosity; alternatively, between 0% and about 1% porosity in the finished CMC article.

As used herein the term "metal or alloy" is intended to refer to a matrix infiltrant, which may comprise any number of materials such as, but not limited to, polymers, metals, and ceramics. Several specific examples of metals that may be used to infiltrate the fiber preform may comprise, without limitation, aluminum, silicon, nickel, titanium, or mixtures and alloys thereof. Several specific examples of ceramics that may be used to infiltrate the fiber preform may include, without limitation, silicon carbide, silicon nitride, alumina, mullite, zirconia, and combinations thereof. Alternatively, the metal or metal alloy infiltrant is silicon, silicon carbide, silicon nitride, or a combination thereof (e.g., silicon/silicon carbide, etc.). When desirable, the metal or metal alloy particles may be combined with other additives or process aids.

The infiltration of the metal or metal alloy may be accomplished at a temperature of at least 1,000° C.; alternatively, about 1,200° C. to about 1,700° C.; alternatively, between about 1,350° C. and about 1,550° C. The duration of the infiltration may range between about 5 minutes to 5 hours; alternatively, from 15 minutes to 4 hours; alternatively, from about 20 minutes to about 2 hours. The infiltration of the molten silicon or silicon alloy may optionally be carried out under vacuum or in an inert environment under atmospheric pressure in order to minimize evaporative losses. Following the infiltration of the metal or metal alloy, the CMC article may optionally be machined to form a suitable finished component or article.

According to another aspect of the present disclosure, a method of forming a green body for use in making a ceramic matrix composite (CMC) article is provided. Referring once again to FIG. 1, this method 30 is similar to or substantially the same as the method described above with respect to steps 31-38.

Example 1—Conduction/Convection Heat Treat Prototype

Figure 2:
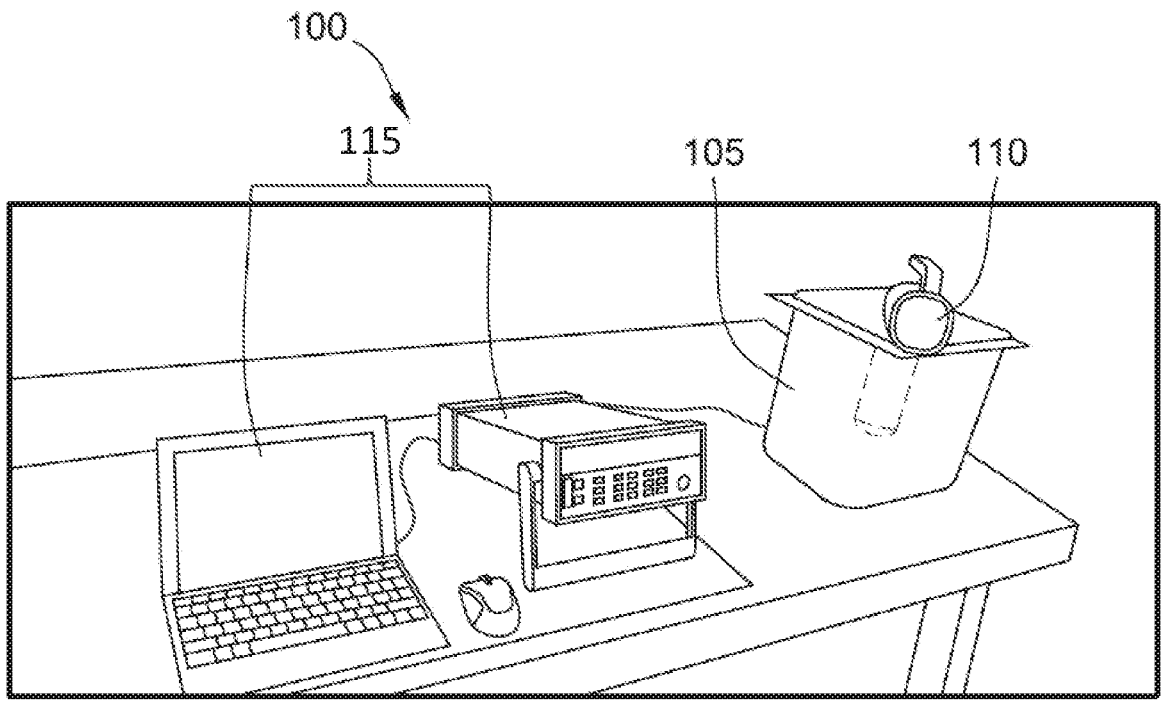
FIG. 2 is a schematic representation of a heat transfer system prototype for use post infiltration of the ceramic slurry according to the teachings of the present disclosure.
Figure 3:
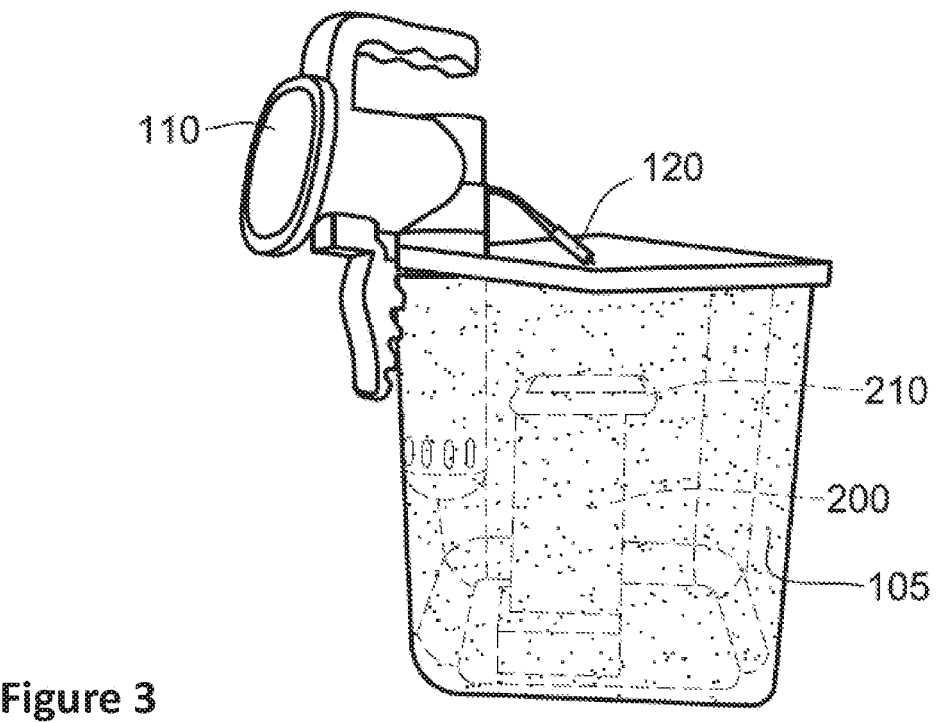
FIG. 3 is a schematic representation of a prototype fluid bath utilized in the heat transfer system of FIG. 2 with a green body submerged therein.

Referring now to FIGS. 2 and 3, a fluid bath prototype heat transfer system 100 was created to demonstrate reduction to practice of the methodology described above and further defined herein. This heat transfer system 100 generally comprises an eighteen (18) quart clear container 105, a thermal immersion circulator 110, a data acquisition (DAQ) system 115, and one or more thermocouples 120.

Once the system 100 described above was set-up, the steps in the method of forming a CMC article as described above and in FIG. 1 were conducted with the fiber preform being placed into a pliable container 210, the fiber preform being infiltrated with a ceramic slurry to form an infiltrated fiber preform 200 under vacuum and then heated through the use of a convection and conduction mechanisms (i.e., transfer of heat from the fluid bath into the slurry infiltrated fiber preform) until fully cured and then subsequently subjected to melt infiltration of silicon or a silicon alloy.

The CMC articles processed using the prototype heat transfer system 100 were subjected to inspection and mechanical tests. The results of this inspection and mechanical testing has demonstrated that the processed CMC articles exhibit or display at least equivalent behavior to identical CMC articles processed using a conventional heat transfer process.

Example 2—Conduction/Convection Heat Transfer Production Equipment

Figure 4:
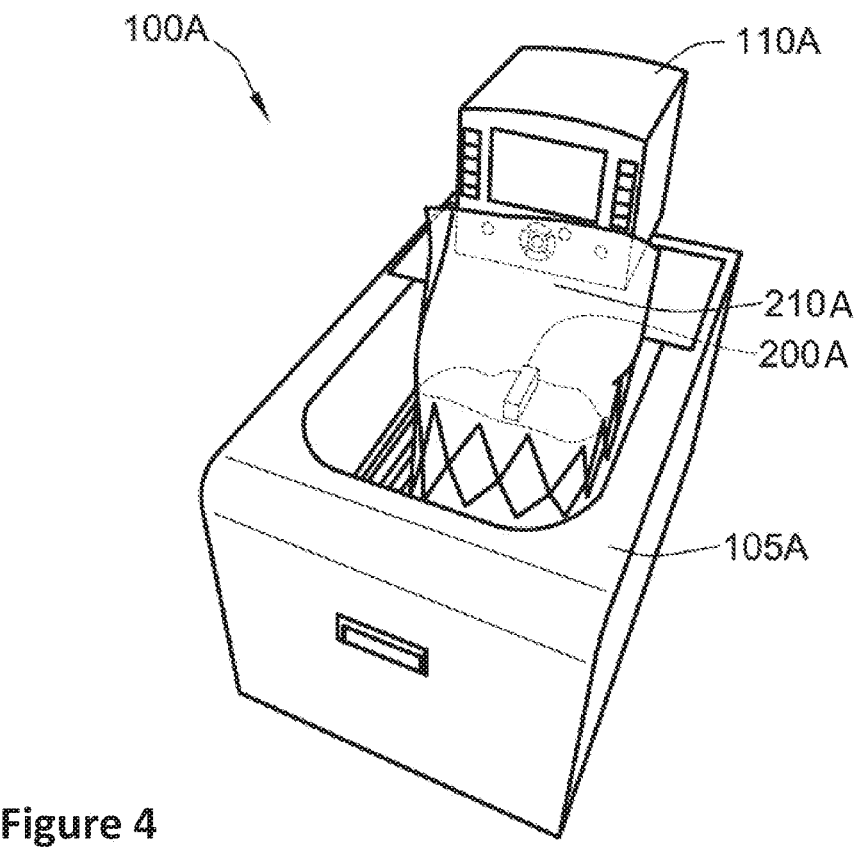
FIG. 4 is a schematic representation of another heat transfer system for use post infiltration of the ceramic slurry according to the teachings of the present disclosure.
Figure 5:
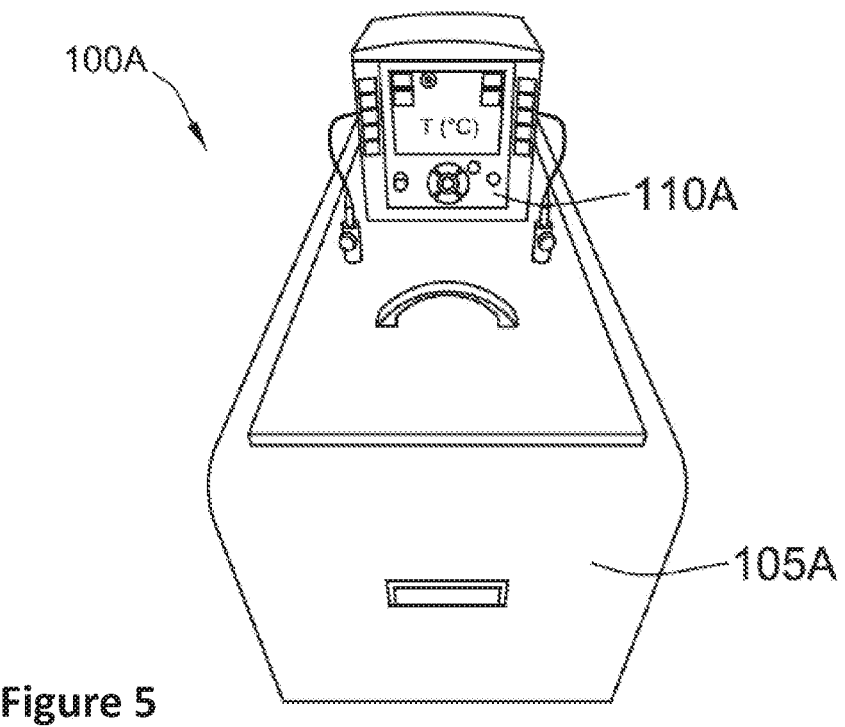
FIG. 5 is a schematic representation of a pre-production fluid circulation bath utilized in the heat transfer system of FIG. 4 during operation thereof.

In order to make the heat process more robust, the process described in this Example 2 is the same as that performed in Example 1, except for the equipment; which is more suitable for production. Referring now to FIGS. 4 and 5, the production heat transfer system 100A includes and industrial fluid bath 105A equipped with a circulation unit 110A and connected to a data acquisition (DAQ) system and one or more thermocouples (not shown).

The steps in the method of forming a CMC article as described above and in FIG. 1 were conducted with the fiber preform being placed into a pliable container 210A, the fiber preform being infiltrated with a ceramic slurry to form an infiltrated fiber preform 200A under vacuum and then heated through the use of conduction and convection mechanisms (i.e., transfer of heat from the production fluid bath into the slurry infiltrated fiber preform) until fully cured and then subsequently subjected to melt infiltration of silicon or a silicon alloy.

The CMC parts processed using the production heat transfer system 100A were subjected to inspection and mechanical tests. The results of this inspection and mechanical testing has demonstrated that the processed CMC articles exhibit or display at least equivalent behavior to identical CMC articles processed using a conventional heat transfer process.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The subject-matter of the disclosure may also relate, among others, to the following Aspects:

A first aspect relates to a method of producing a ceramic matrix composite (CMC) article, the method comprising steps of: forming a fiber preform; optionally, rigidizing the fiber preform with a fiber interphase coating; transforming the fiber preform into a green body; the transformation process comprising: placing the fiber preform inside a pliable container having an internal volume and an external surface; infiltrating a ceramic slurry into the fiber preform to form a wet infiltrated preform; creating a pressure differential between the internal volume and the external surface of the pliable container, such that the ceramic slurry remains within the rigidized fiber preform; placing the pliable container and wet infiltrated preform into a fluid bath at ambient temperature; heating the fluid bath to a predetermined hold temperature; maintaining the fluid bath at the hold temperature for a predetermined time period, wherein the heat from the fluid bath is transferred to the wet infiltrated preform by convection, conduction, or a combination thereof, such that the wet infiltrated preform is transformed into the green body; removing the pliable container from the fluid bath; and removing the green body from the pliable container; optionally, conducting one or more secondary operations on the green body; and infiltrating the green body with a molten silicon or silicon alloy to form the CMC article.

A second aspect relates to the method of the first aspect, wherein the ceramic slurry consists of a plurality of solid particulate fillers, one or more reactive additives, a solvent, and optionally, one or more dispersants, binders, and/or gelation polymers.

A third aspect relates to the method of the second aspect, wherein the solid particulate fillers comprise silicon carbide (SiC), silicon nitride ($Si_3N_4$), or a mixture thereof.

A fourth aspect relates to the method of the second or third aspect, wherein the one or more reactive additives includes at least one of graphite, diamond, carbon black, molybdenum (Mo), and tungsten (W).

A fifth aspect relates to the method of any preceding aspect, wherein the ceramic slurry infiltrated into the fiber preform comprises a solid loading in the range of about 10 vol. % to about 70 vol. % relative to the overall volume of the ceramic slurry.

A sixth aspect relates to the method of any preceding aspect, wherein rigidizing the fiber preform with the fiber interphase coating uses a chemical vapor infiltration (CVI) process.

A seventh aspect relates to the method of any preceding aspect, wherein the fiber interphase coating comprises silicon carbide (SiC), silicon nitride ($Si_3N_4$), or a mixture thereof.

An eighth aspect relates to the method of any preceding aspect, wherein the fiber preform comprises fibers that include one or more of silicon carbide (SiC), silicon nitride ($Si_3N_4$), or a mixture thereof.

A ninth aspect relates to the method of any preceding aspect, wherein the heating of the fluid bath comprises heating at a rate that ranges from about 0.5° C./min to about 2° C./min.

A tenth aspect relates to the method of any preceding aspect, wherein the temperature difference between the fluid bath and the ceramic slurry in the wet infiltrated preform is less than 3° C.

An eleventh aspect relates to the method of any preceding aspect, wherein the predetermined hold temperature is reached in about 50 minutes.

A twelfth aspect relates to the method of the eleventh aspect, wherein the predetermined hold temperature is in the range from about 30° C. to about 80° C.

A thirteenth aspect relates to the method of the eleventh or twelfth aspect, wherein the predetermined hold temperature is maintained for the predetermined time period that ranges from about 5 minutes to about 24 hours.

A fourteenth aspect relates to the method of any preceding aspect, wherein the fluid bath is a heated bath circulator, such that heat transfer from the fluid bath to the ceramic slurry in the wet infiltrated perform is uniformly distributed.

A fifteenth aspect refers to a method of forming a green body for use in making a ceramic matrix composite (CMC) article, the method comprising: placing the fiber preform inside a pliable container having an internal volume and an external surface; infiltrating a ceramic slurry into a fiber preform to form a wet infiltrated preform; creating a pressure differential between the internal volume and the external surface of the pliable container, such that the ceramic slurry remains within the fiber preform; placing the pliable container and wet infiltrated preform into a fluid bath at ambient temperature; heating the fluid bath to a predetermined hold temperature; maintaining the fluid bath at the hold temperature for a predetermined time period, wherein the heat from the fluid bath is transferred to the wet infiltrated preform by convection, conduction, or a combination thereof, such that the wet infiltrated preform is transformed into the green body; removing the pliable container from the fluid bath; and removing the green body from the pliable container.

A sixteenth aspect refers to the method of the fifteenth aspect, wherein the ceramic slurry consists of a plurality of solid particulate fillers, one or more reactive additives, a solvent, and optionally, one or more dispersants, binders, and/or gelation polymers; wherein the solid particulate fillers comprise silicon carbide (SiC), silicon nitride ($Si_3N_4$), or a mixture thereof present in a solid loading in the range of about 10 vol. % to about 70 vol. % relative to the overall volume of the ceramic slurry; wherein the one or more reactive additives includes at least one of graphite, diamond, carbon black, molybdenum (Mo), and tungsten (W).

A seventeenth aspect refers to the method of the fifteenth or sixteenth aspect, wherein the fiber preform comprises fibers that include one or more of silicon carbide (SiC), silicon nitride ($Si_3N_4$), or a mixture thereof; wherein the fiber preform is optionally rigidized via a chemical vapor infiltration (CVI) process with a fiber interphase coating that comprises silicon carbide (SiC), silicon nitride ($Si_3N_4$), or a mixture thereof.

An eighteenth aspect refers to the method of any of the fifteenth through the seventeenth aspects, wherein the heating of the fluid bath comprises heating at a rate that ranges from about 0.5° C./min to about 2° C./min; wherein the temperature difference between the fluid bath and the ceramic slurry in the wet infiltrated preform is less than 3° C.

A nineteenth aspect relates to the method of the eighteenth aspect, wherein the predetermined hold temperature is reached in about 50 minutes; wherein the predetermined hold temperature is in the range from about 30° C. to about 80° C.; wherein the hold temperature is maintained for the predetermined time period that ranges from about 5 minutes to about 24 hours.

A twentieth aspect relates to the method of any of the fifteenth through the nineteenth aspects, wherein the fluid bath is a heated bath circulator, such that heat transfer from the fluid bath to the ceramic slurry in the wet infiltrated perform is uniformly distributed.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of producing a ceramic matrix composite (CMC) article, the method comprising steps of:
    forming a fiber preform;
    transforming the fiber preform into a green body; the transformation process comprising:
        placing the fiber preform inside a pliable container having an internal volume and an external surface; and
        infiltrating a ceramic slurry comprising solid particulate fillers and a solvent into the fiber preform to form a wet infiltrated preform, the solvent consisting of water or isopropanol, the ceramic slurry not including a gelation polymer;
    drying the wet infiltrated preform to form the green body; wherein drying the wet infiltrated preform comprises:
        creating a pressure differential between the internal volume and the external surface of the pliable container, such that the ceramic slurry remains within the wet infiltrated fiber preform;
        placing the pliable container and the wet infiltrated preform into a fluid bath at ambient temperature;
        heating the fluid bath to a predetermined hold temperature;
        maintaining the fluid bath at the hold temperature for a predetermined time period, wherein the heat from the fluid bath is transferred to the wet infiltrated preform at least partially by conduction, such that the wet infiltrated preform is transformed into the green body;
        removing the pliable container from the fluid bath; and
        removing the green body from the pliable container; and
    infiltrating the green body with a molten silicon or silicon alloy to form the CMC article.

2. The method according to claim 1, wherein the ceramic slurry consists of the solid particulate fillers, one or more reactive additive, the solvent, and one or more dispersants or binders.

3. The method according to claim 2, wherein the one or more reactive additives includes at least one of graphite, diamond, carbon black, molybdenum (Mo), and tungsten (W).

4. The method according to claim 1, wherein the solid particulate fillers comprise silicon carbide (SIC), silicon nitride ($Si_3N_4$), or a mixture thereof.

5. The method according to claim 1, wherein the ceramic slurry infiltrated into the fiber preform comprises a solid loading in the range of about 10 vol. % to about 70 vol. % relative to the overall volume of the ceramic slurry.

6. The method according to claim 1, further comprising, prior to transforming the fiber preform into a green body, rigidizing the fiber preform with a fiber interphase coating,
    wherein rigidizing the fiber preform with the fiber interphase coating uses a chemical vapor infiltration (CVI) process.

7. The method according to claim 6, wherein the fiber interphase coating comprises silicon carbide (SiC), silicon nitride ($Si_3N_4$), or a mixture thereof.

8. The method according to claim 1, wherein the fiber preform comprises silicon carbide (SiC), silicon nitride ($Si_3N_4$), or a mixture thereof.

9. The method of claim 1, wherein the heating of the fluid bath comprises heating at a rate that ranges from about 0.5° C./min to about 2° C./min.

10. The method according to claim 9, wherein the predetermined hold temperature is reached in about 50 minutes.

11. The method of according to claim 1, wherein the temperature difference between the fluid bath and the ceramic slurry in the wet infiltrated preform is less than 3° C.

12. The method according to claim 10, wherein the predetermined hold temperature is in the range from about 30° C. to about 80° C.

13. The method according to claim 12, wherein the hold temperature is maintained for the predetermined time period that ranges from about 5 minutes to about 24 hours.

14. The method according to claim 1, wherein the fluid bath is a heated bath circulator, such that heat transfer from the fluid bath to the ceramic slurry in the wet infiltrated preform is uniformly distributed.

15. The method according to claim 1, wherein the fiber preform comprises fibers that include one or more of silicon carbide (SiC), silicon nitride ($Si_3N_4$), or a mixture thereof;

wherein, prior to placing the fiber preform inside the pliable container, the fiber preform is rigidized via a chemical vapor infiltration (CVI) process with a fiber interphase coating comprising silicon carbide (SIC), silicon nitride ($Si_3N_4$), or a mixture thereof.

16. The method according to claim 1, wherein the heating of the fluid bath comprises heating at a rate that ranges from about 0.5° C./min to about 2° C./min;

wherein the temperature difference between the fluid bath and the ceramic slurry in the wet infiltrated preform is less than 3° C.

17. The method according to claim 16, wherein the predetermined hold temperature is reached in about 50 minutes;

wherein the hold temperature is maintained for the predetermined time period that ranges from about 5 minutes to about 24 hours.

18. A method of forming a green body for use in making a ceramic matrix composite (CMC) article; the method comprising:

placing a fiber preform inside a pliable container having an internal volume and an external surface;

infiltrating a ceramic slurry into the fiber preform to form a wet infiltrated preform, the ceramic slurry comprising solid particulate fillers and a solvent, the solvent consisting of water or isopropanol, the ceramic slurry not including a gellation polymer; and drying the wet infiltrated preform to form the green body; wherein drying the wet infiltrated preform comprises:

creating a pressure differential between the internal volume and the external surface of the pliable container, such that the ceramic slurry remains within the wet infiltrated fiber preform;

placing the pliable container and the wet infiltrated preform into a fluid bath at ambient temperature;

heating the fluid bath to a predetermined hold temperature; wherein the predetermined hold temperature is in the range from about 30° C. to about 80° C.;

maintaining the fluid bath at the hold temperature for a predetermined time period, wherein the heat from the fluid bath is transferred to the wet infiltrated preform at least partially by conduction, such that the wet infiltrated preform is transformed into the green body;

removing the pliable container from the fluid bath; and removing the green body from the pliable container.

19. The method according to claim 18, wherein the ceramic slurry consists of the solid particulate fillers, one or more reactive additive, the solvent, and one or more dispersants or binders;

wherein the solid particulate fillers comprise silicon carbide (SiC), silicon nitride ($Si_3N_4$), or a mixture thereof present in a solid loading in the range of about 10 vol. % to about 70 vol. % relative to the overall volume of the ceramic slurry;

wherein the one or more reactive additives includes at least one of graphite, diamond, carbon black, molybdenum (Mo), and tungsten (W).

20. The method according to claim 18, wherein the fluid bath is a heated bath circulator, such that heat transfer from the fluid bath to the ceramic slurry in the wet infiltrated preform is uniformly distributed.

\* \* \* \* \*